UNITED STATES PATENT OFFICE.

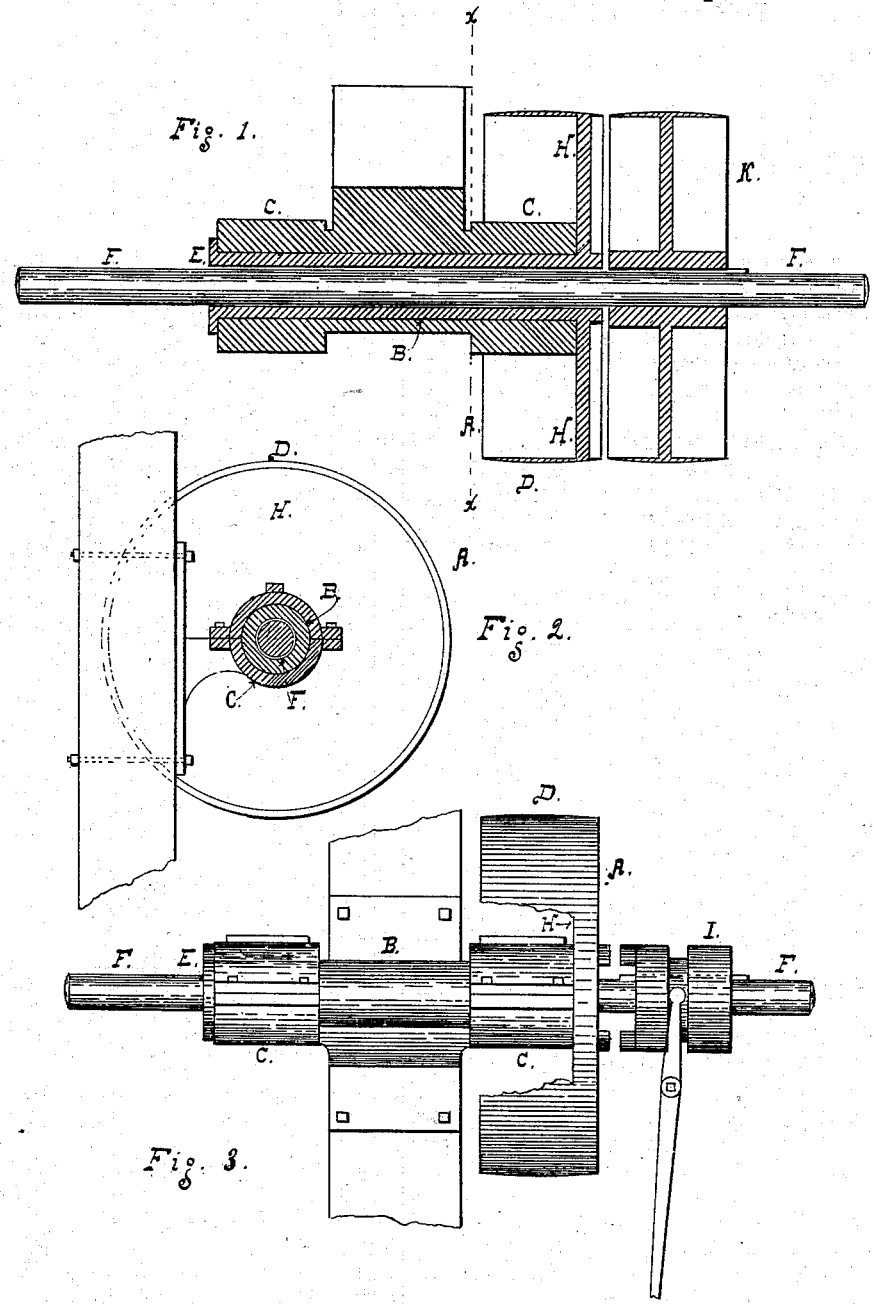

GEORGE H. ALBEE, OF NEENAH, WISCONSIN.

LOOSE PULLEY.

SPECIFICATION forming part of Letters Patent No. 276,208, dated April 24, 1883.

Application filed February 16, 1883. (No model.)

*To all whom it may concern:*

Be it known that I, GEORGE H. ALBEE, a citizen of the United States, residing at Neenah, in the county of Winnebago and State of Wisconsin, have invented a new and useful Improvement in Pulleys, of which the following is a specification.

My invention relates to an improved form, construction, and application of a pulley as a substitute for the loose pulley as now used in mechanical devices, in connection with a tight pulley or clutch which is secured to and revolves with a shaft for the purpose of receiving and transmitting power in the various applications required in mechanical operations; and the object of my improvement is to form a pulley which can be so applied, and obviate the well-known difficulty arising from the enlargement of its bore caused by insufficient lubrication and unavoidable wear, and consequent unsteadiness of rotation and accompanying noise. I attain these objects by the methods illustrated in the accompanying drawings, in which—

Figure 1 is a plan in section of the pulley in its bearings, and the shaft, with a pulley attached, in combination with which it is adapted to be used. Fig. 2 is a vertical cross-section of the pulley in its bearings upon the line $x\ x$ of Fig. 1. Fig. 3 is an elevation showing the pulley in its bearings, adapted for use in combination with a clutch-sleeve attached to the shaft in connection with which it is used.

Similar letters of reference indicate corresponding parts in the several views.

The pulley A is made with its hub B of metal, which may be cast or wrought iron, cast-steel, brass, or other suitable material; its central portion or arms H and its rim D of wood, metal, paper, or any other substance suited to its purpose, its hub B being extended upon one of its ends sufficiently for a journal upon which it revolves in the bearings C, said bearings being so placed in position for its support that the shaft in combination with which it is used shall occupy a central position in its bore. At the outer end of the hub or journal is a collar, E, for retaining said journal in the bearings and preventing its longitudinal movement; or the journal may have one or more V or other shaped grooves formed in its outer surface, into which the metallic lining of the bearing, when in a fluid state, may flow, and accomplish the same purpose. There may be one or more bearings, as the size of pulley and labor required may demand. The hub or journal B is bored sufficiently large so that the shaft F, to which it is applied, can pass through without contact therewith. The arms or central portion, H, are preferably placed near the end of the pulley, as represented, for the purpose of providing a longer bearing-surface upon its journal B and extending that surface past the central line of the belt-surface.

The rim D may be formed on its outer surface as required for round or flat belts, wire or other rope, or a chain.

The pulley, when small, is most easily formed of a single casting or piece, but when of large size best formed with its hub or journal, its arms or central portion, and its rim, one or all, separate, and joined together with bolts or other suitable connecting devices.

The pulley as described is designed to be used with either a clutch, I, or tight pulley K, as represented in Figs. 3 and 1, secured to the shaft passing through both, and by operating the clutch or shifting the belt from one to the other of the pulleys the rotation of the shaft (or pulley, as the case may be, in regard to whichever is in connection with the driving-power) is governed as desired.

The advantages produced by the use of this improved pulley as a substitute for the ordinary loose pulley are: First, it revolves in its individual bearings instead of upon a shaft, whereby its continual lubrication is more successfully accomplished; second, not revolving upon the shaft, it does not become unbalanced by the enlargement of its bore, producing disagreeable noise and unavoidable jarring; third, the shaft which passes through it does not become worn and weak, requiring renewal at oft-recurring periods, notwithstanding the speed may be great; fourth, whenever its bearings require relining, its removal from the shaft is not required, as by removing the bearings in which the pulley revolves and the old lining therefrom a new one may be quickly inserted; fifth, should its journal become cut or worn, it can be again turned and polished and the bearings relined to fit the same; sixth, this pulley is adapted to be used upon mechanical devices in connection with a tight pulley, to which the belt being shifted, the former remains stationary. It is also adapted for use with a clutch attached to the shaft passing centrally through the pulley, which being the driving-shaft, the disengagement of the clutch leaves the pulley at rest, and while so it is not demanding power and lubrication and producing disagreeable noise and jarring, which it communicates to the machinery with which it is connected.

The clutch as represented in Fig. 3 is no part of my present invention, as clutches of various descriptions may be used, as found suited to the labor required or the taste of the operator.

What I claim as my invention, and desire to secure by Letters Patent, is—

1. As an improved article of manufacture, a pulley formed substantially as described, having its hub extended upon one of its ends, said hub serving as a journal upon which it revolves in a bearing or bearings, and having the bore of said pulley of a size sufficient for the passage, without contact, of the shaft in combination with which it is used, the face of said pulley being adapted for being driven by a flat or round belt, wire or other rope, or a chain, substantially as described and set forth.

2. The combination, with a pulley formed substantially as described, of the following elements: a bearing or bearings in which said pulley is supported and revolves, a shaft passing centrally through the bore of said pulley without contact therewith, and supported in suitable bearings, and secured to said shaft a pulley revolving with said shaft, the latter pulley being properly located for the shifting of the belt from one to the other of the aforesaid pulleys, substantially as described.

3. The combination, with a pulley formed substantially as described, of the following elements: a bearing or bearings in which said pulley is supported and revolves, a shaft passing centrally through the bore of said pulley without contact therewith, and supported in suitable bearings, and secured to said shaft a clutch-sleeve revolving with said shaft, but having a longitudinal movement independent thereof, and means for its engagement and disengagement with the aforesaid pulley, substantially as herein set forth.

GEORGE H. ALBEE.

Witnesses:
HERMAN B. SCHOOLEY,
GEORGE RUSSELL.